T. DEAN.
MACHINE FOR MAKING BOOK COVERS.
APPLICATION FILED JUNE 28, 1918.
1,336,944.
Patented Apr. 13, 1920.
6 SHEETS—SHEET 1.
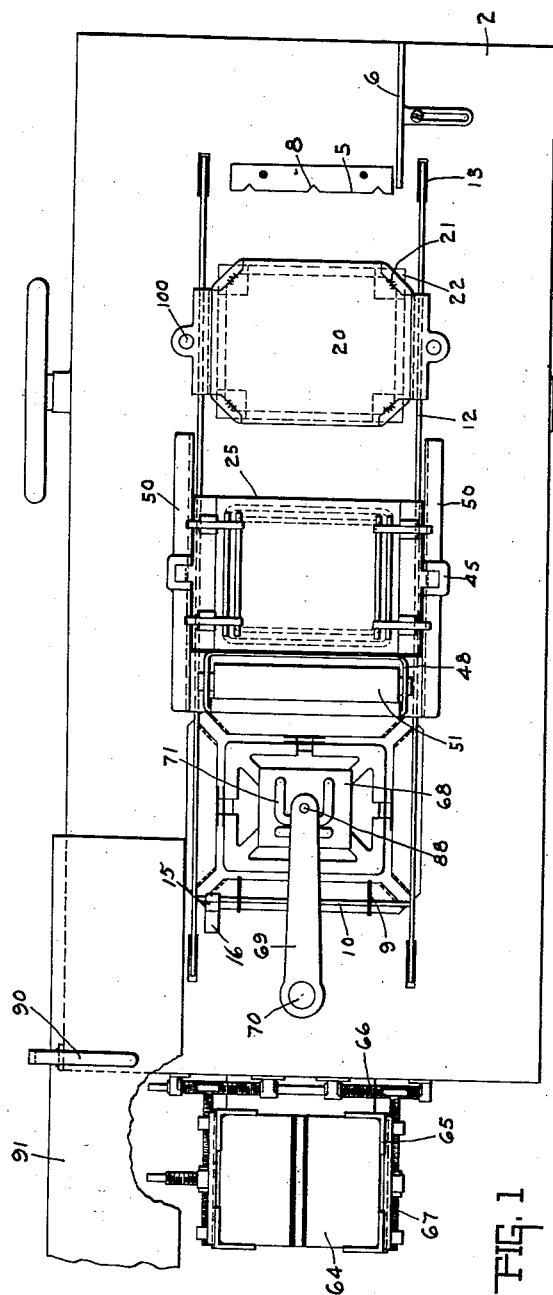
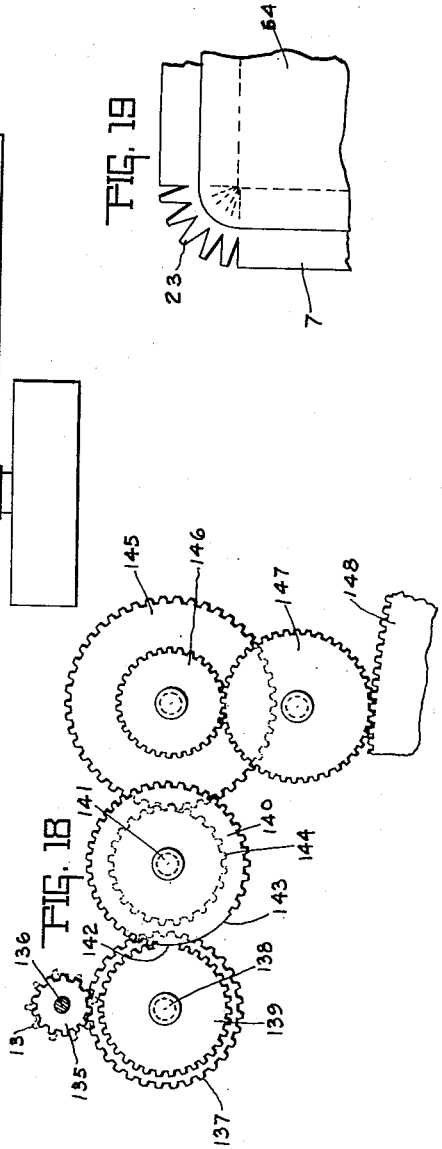
INVENTOR
THOMAS DEAN
BY
Lockwood-Lockwood
ATTORNEYS.

T. DEAN.
MACHINE FOR MAKING BOOK COVERS.
APPLICATION FILED JUNE 28, 1918.
1,336,944.
Patented Apr. 13, 1920.
6 SHEETS—SHEET 2.
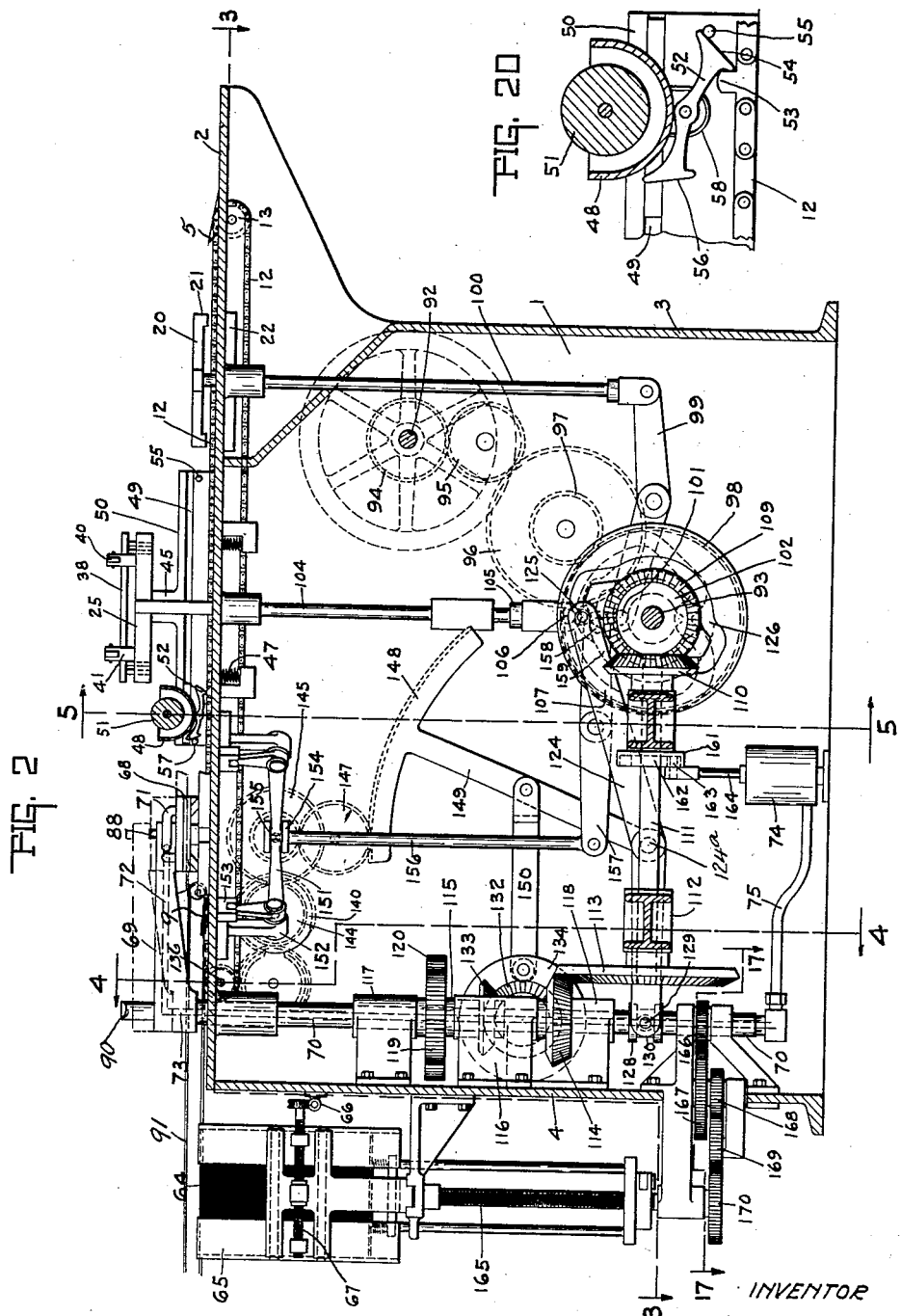
INVENTOR
THOMAS DEAN
BY
ATTORNEYS T. DEAN.
MACHINE FOR MAKING BOOK COVERS.
APPLICATION FILED JUNE 28, 1918.
1,336,944.
Patented Apr. 13, 1920.
6 SHEETS—SHEET 3.
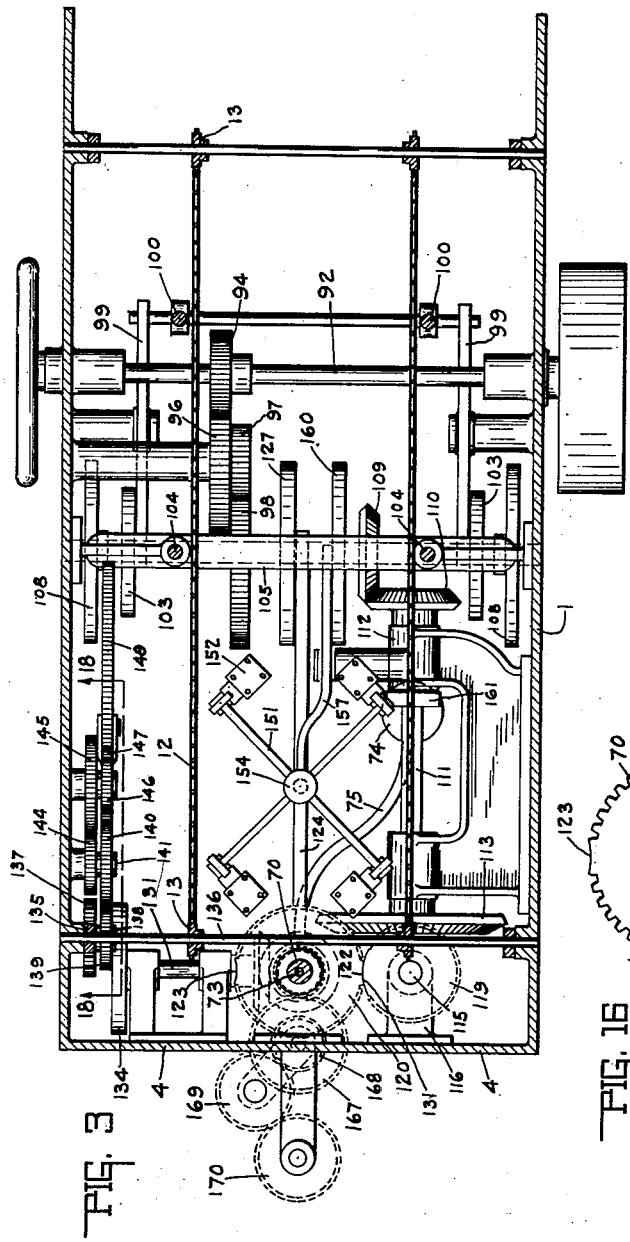
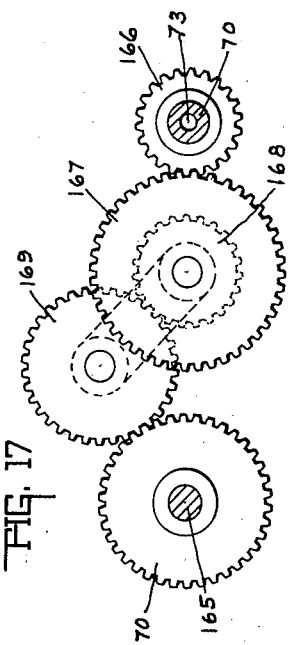
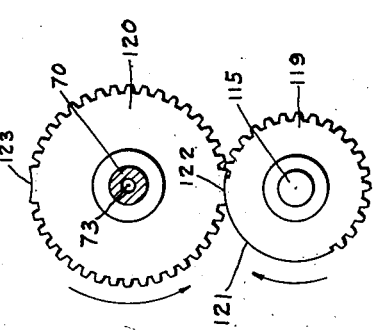
INVENTOR
THOMAS DEAN
BY
ATTORNEYS.

T. DEAN.
MACHINE FOR MAKING BOOK COVERS.
APPLICATION FILED JUNE 28, 1918.
1,336,944.
Patented Apr. 13, 1920.
6 SHEETS—SHEET 4.
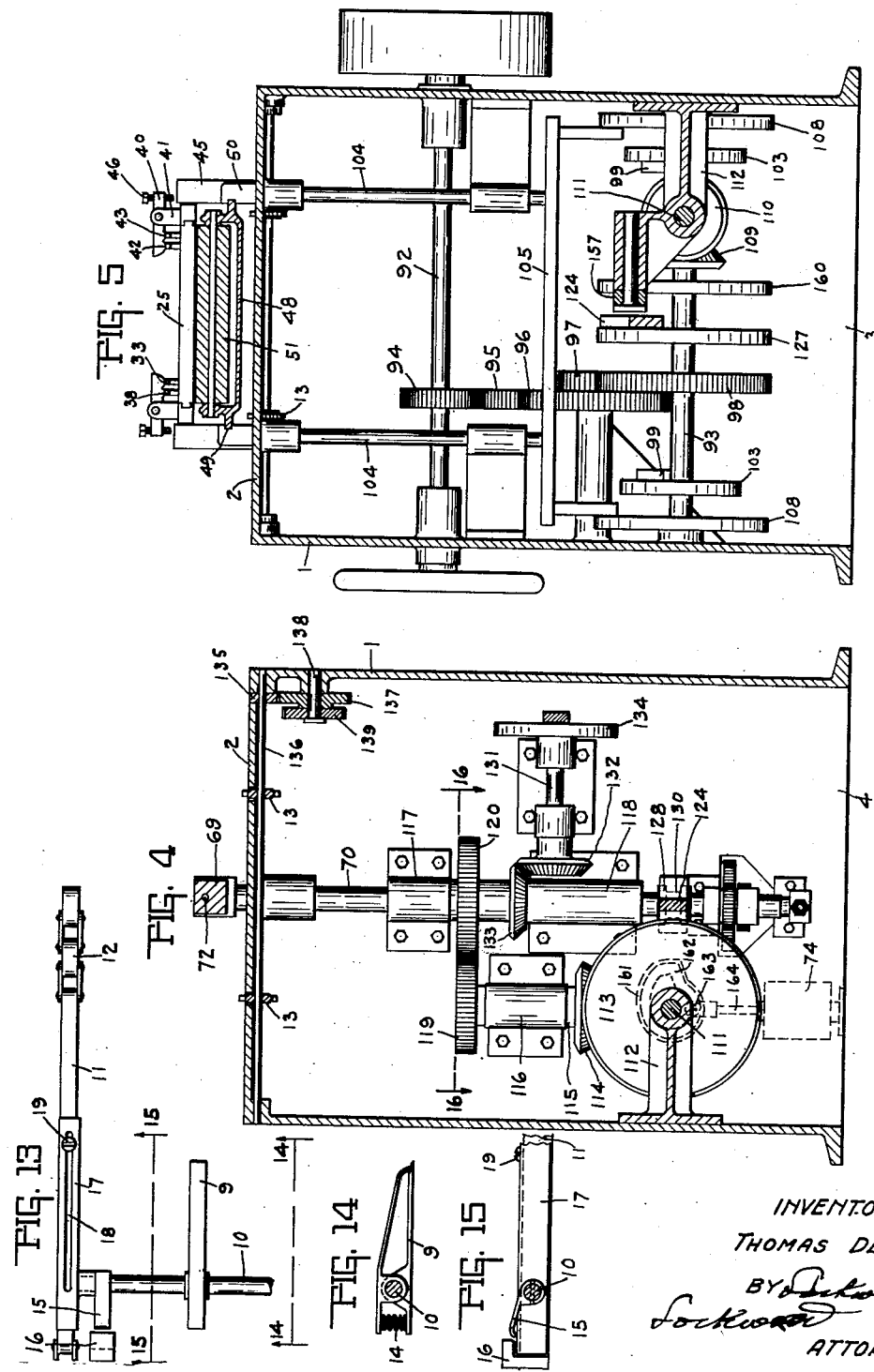
INVENTOR
THOMAS DEAN.
ATTORNEYS.

T. DEAN.
MACHINE FOR MAKING BOOK COVERS.
APPLICATION FILED JUNE 28, 1918.
1,336,944.
Patented Apr. 13, 1920.
6 SHEETS—SHEET 5.
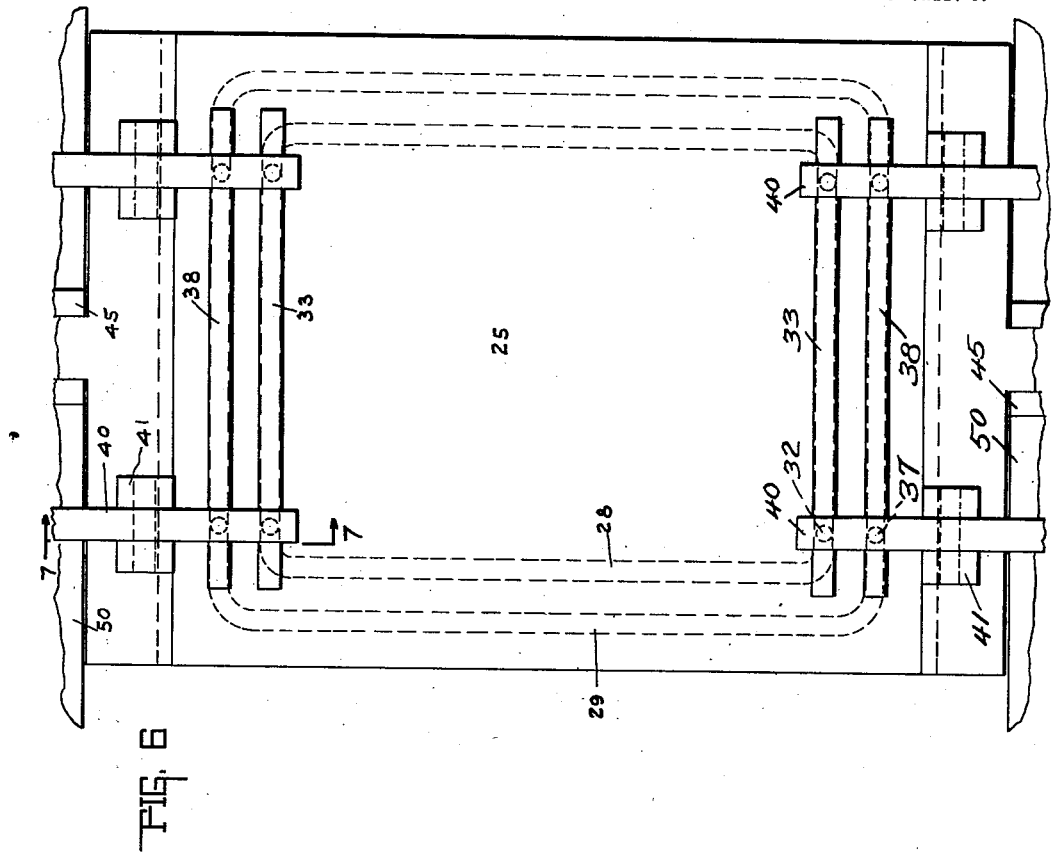
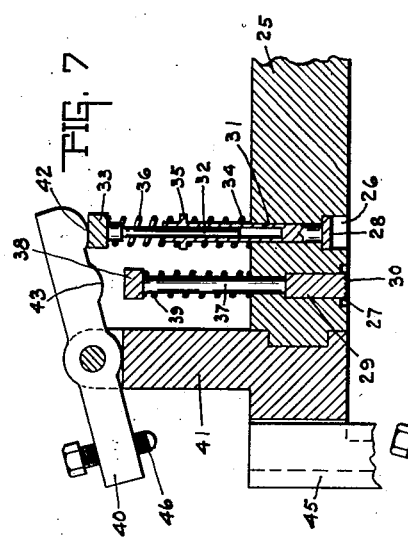
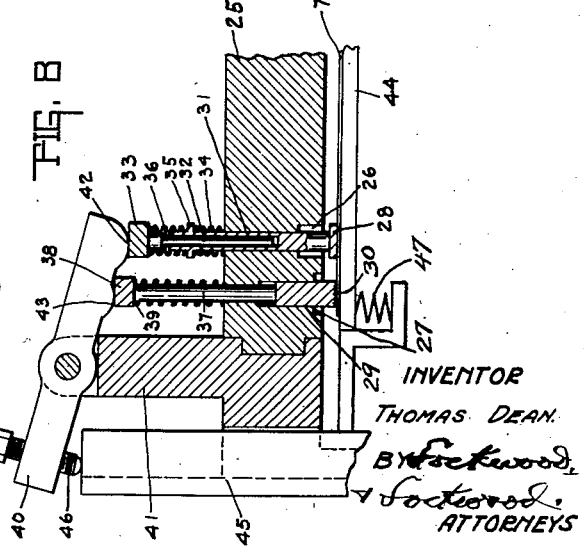
INVENTOR
THOMAS DEAN.
BY Lockwood
+ Lockwood
ATTORNEYS

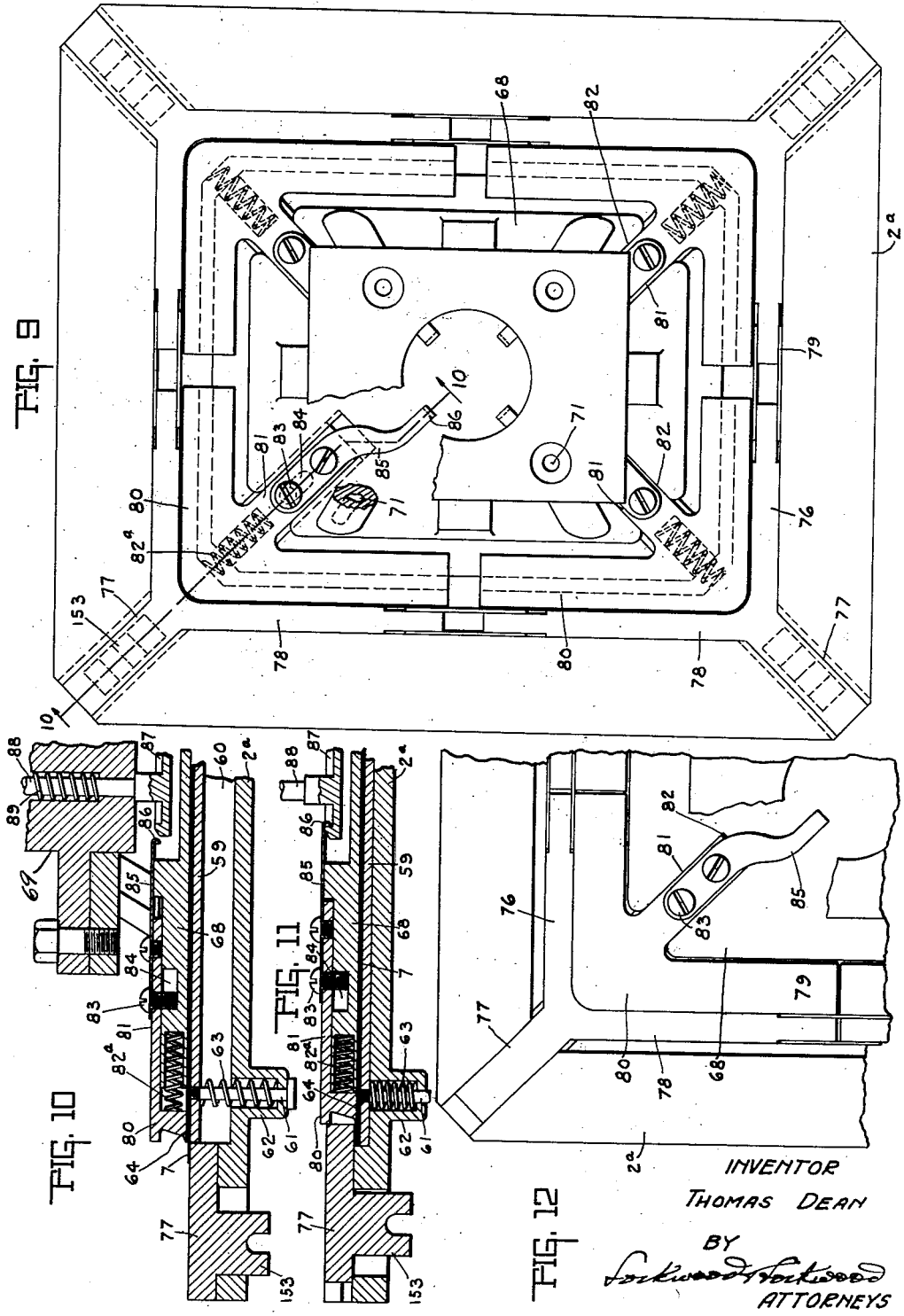

UNITED STATES PATENT OFFICE.

THOMAS DEAN, OF INDIANAPOLIS, INDIANA.

MACHINE FOR MAKING BOOK-COVERS.

1,336,944.  Specification of Letters Patent.  Patented Apr. 13, 1920.

Application filed June 28, 1918.  Serial No. 242,483.

*To all whom it may concern:*

Be it known that I, THOMAS DEAN, a citizen of the United States, and a resident of Indianapolis, county of Marion and State of Indiana, have invented a certain new and useful Machine for Making Book-Covers; and I do hereby declare that the following is a full, clear, and exact description thereof, reference being had to the accompanying drawings, in which like letters refer to like parts.

This invention relates to machines for making book covers and particularly to that class of book covers which are flexible and have round corners.

One feature of the invention is the provision of means for folding the edges and corners of a covering material over a cover board having a rounded corner, the parts of the covering material will not be placed in folds.

A further feature of the invention is the provision of means for first positioning the edge portions of the covering material for folding over the edges of the cover boards and then disposing the folded portions over the faces of the cover boards.

A further feature of the invention is the provision of automatically operated means for picking up a pair of cover boards, then placing the cover boards over the covering material and holding the same in proper position while the edges of the covering material are being secured to the cover boards and then removing the completed cover and depositing the same at a predetermined point. A further feature of the invention is the provision of means for intermittently operating the folding mechanism and cover board transporting mechanism. A further feature of the invention is the provision of a support for holding a plurality of the cover boards, and means for adjusting said support for maintaining the uppermost boards in position to be engaged by the board conveying mechanism.

Other objects and advantages will be hereinafter more fully set forth in the accompanying specification.

Referring to the drawings which are made a part of this application, Figure 1 is a top plan view of the cover-forming machine. Fig. 2 is a vertical longitudinal sectional view of the machine showing the operating parts in side elevation. Fig. 3 is a sectional view as seen on line 3—3, Fig. 2. Fig. 4 is a vertical transverse sectional view as seen on line 4—4, Fig. 2. Fig. 5 is a similar view as seen on line 5—5, Fig. 2. Fig. 6 is an enlarged detail top plan view of the adhesive applying mechanism. Fig. 7 is a sectional view thereof as seen on line 7—7, Fig. 6, with the parts in inoperative position. Fig. 8 is a similar view with the parts in operative position. Fig. 9 is an enlarged top plan view of the suction head employed for placing the cover boards in position over the covering material; also, showing the suction head in coöperative relation with the folding mechanism for folding the edges of the covering material. Fig. 10 is a detail sectional view as seen on line 10—10, Fig. 9, showing the parts of the folding mechanism before the edges of the covering material have been positioned to be folded. Fig. 11 is a similar view showing the position of parts during the folding operation. Fig. 12 is a top plan view of one corner of the folding mechanism showing the position of the parts during the folding operation. Fig. 13 is a top plan view of a portion of the mechanism that is employed for moving the covering material through the machine. Fig. 14 is a sectional view thereof as seen on line 14—14, Fig. 13. Fig. 15 is a similar view as seen on line 15—15, Fig. 13. Fig. 16 is a section on line 16—16 of Fig. 4 showing the gears for intermittently operating the cover board controlling mechanism. Fig. 17 is a sectional view on line 17—17, Fig. 2, showing the gears for operating the adjusting mechanism for the cover board support. Fig. 18 is a sectional view on line 18—18, Fig. 3, showing the gears for intermittently operating the conveying mechanism for covering material, the corner cutting mechanism, the adhesive applying mechanism and the folding mechanism. Fig. 19 is a fragmentary view showing one corner of the cover board and covering material before the edges of the covering material are folded over the cover board, the position of the covering material after being folded being shown by dotted lines. Fig. 20 is a sectional view showing the manner of operating the adhesive applying mechanism.

Referring to the drawings, in which similar reference numerals designate corresponding parts throughout the several views, 1 indicates a frame of any desired construction, the upper end of which is provided with a platform 2, said frame having end walls 3 and 4.

In carrying out the invention, guides 5 and 6 are mounted upon the platform 2, adjacent one end thereof with which are successively registered sheets of covering material 7, said covering material preferably consisting of leather, although other flexible substances may be used if desired. One edge and one end of the sheet of covering material is registered respectively with the guides 5 and 6, the guide 5 having recesses 8 in the edge thereof over which the side edge of the sheet of covering material rests so that one jaw of the grippers 9 will pass below and the other above the edge of the sheet of material.

The grippers 9 are mounted upon a shaft 10, the ends of which are adjustably secured to elongated links 11 of endless chains 12, said chains extending around sprocket wheels 13 carried by the platform 2. The fingers forming the grippers 9 are arranged in pairs and are hinged together, the lower finger being pivoted on the shaft 10 while the upper finger is fixed to the shaft and adapted to rotate therewith, the gripping edges of the fingers being normally held in engagement with each other by means of a spring 14, positioned between the opposite ends of the fingers of the gripper and on the opposite side of the shaft 10 from the gripping ends of the fingers. Any suitable means may be provided for rotating the shaft 10 in order to swing the upper fingers of the grippers to open position, but in this instance, as shown in Fig. 15, an arm 15 is attached to the shaft 10 which coöperates with the tripping block 16.

The bearings for the ends of the shaft 10 may be adjustably attached to the links 11 in any suitable manner, but in the present instance, as best shown in Figs. 13 and 15, angle bars 17 are mounted upon the links 11, through which are formed elongated slots 18, clamping screws 19 extending through said slots for locking the angle bars in their adjusted positions.

After the grippers have engaged a sheet of covering material, they are moved longitudinally along the platform 2 by a mechanism to be hereinafter described, and positioned below a corner trimming block 20 (Fig. 1) and between dies 21 and 22, carried respectively by the corner trimming block and the platform. At this time the mechanism for moving the grippers and the sheet of covering material are inactive so that the sheet of material will remain stationary a sufficient length of time to permit the operation of the corner trimming block. The dies 21 and 22 are so formed that they will cut the overlapping parts of the covering material, at the corners of the sheet, into tapered strips 23 (Fig. 19) so that when said strips are folded over, such folded over portion will lie flat upon the face of the cover boards 64 and without forming overlapping or uneven surfaces, although the corner produced is curved.

As soon as the corner trimming block is operated, the parts controlling the grippers are again set in motion and the sheet of covering material moved to position below an adhesive applying mechanism where the operating mechanism, controlling the movement of the gripper operating parts, is again brought in inoperative position so that the covering material will remain stationary a sufficient time to apply a required amount of adhesive material. As best shown in Figs. 1, 6, 7 and 8 the adhesive applying mechanism comprises a plate 25 in the lower face of which are formed channels 26 and 27 and in said channels are mounted a clamping frame 28 and an adhesive applying frame 29 respectively, the lower face of the adhesive applying frame being preferably provided with corrugations 30 in order to obtain and apply a greater amount of the adhesive material. The clamping frames 28 are forced downwardly by means of plungers 31 which extend upwardly through the plate 25 and are hollow at their upper ends to receive stems 32 which are attached at their upper ends to cross bars 33, said cross bars being adapted to receive pressure to force the plungers downwardly and move the clamping frame into engagement with the covering material. The clamping frame 28 is normally returned into the channel 26 by a spring 34 around the upper portion of the plunger 31, the upper end of said spring pressing against a collar 35 on the plunger. The stem 32 is slidable in the plunger 31 and is normally held in elevated position by means of a spring 36. one end of which engages the upper face of the collar 35, while the opposite end presses against the lower face of the cross bar 33, the tension of the spring 36 being such that the clamping frame 28 may be lowered to tightly press the sheet of covering material 7 without compressing the spring 36. The adhesive applying frame 29 is forced downwardly by means of plungers 37, the upper ends of which are connected to a cross bar 38, the frame 29 being normally held seated in its channel 27 by springs 39 around the plungers 37 between the plate 25 and the cross bars 38.

The frames 28 and 29 are operated by means of rocking levers 40 which are pivoted between their ends to standards 41, the inner ends of said levers having curved projections 42 and 43 which engage respectively with the cross bars 33 and 38, said levers, when rocked upon their pivots in one direction, forcing downwardly on the plungers 31 and 37 and causing the frames 28 and 29 to engage with the covering material 7, the frame 28 holding the cover in position upon a movable platform 44 while the frame 29 applies adhesive to the covering material. The levers 40 are rocked upon their pivot pins to operate the frames 28 and 29 through the medium of stationary heads 45 and the adjusting screws 46 carried by the outer ends of the rocking levers 40 coming in contact with the heads 45 as the plate 25 is lowered.

The levers 40 are so arranged that the plunger 31 and the frame 28 attached thereto will be moved into engagement with the covering material 7 before the frame 29 carrying the adhesive substance is engaged with the covering material, and, likewise, in view of the compression of the springs 36, the frame 28 will remain in engagement with the covering material 7 until after the frame 29 has been disengaged therefrom, thereby preventing the covering material from being carried upward by the frame 29 and leaving a quantity of the adhesive substance on the surface of the covering material. The movable platform 44 is held yieldingly in position by means of springs 47 so that the corrugated lower face of the frame 29 (Fig. 7) will not be injured by pressing too firmly against the movable platform when the frame is lowered to place the adhesive on the covering material.

As best shown in Figs. 2, 5 and 20 the adhesive material is applied to the corrugated face of the frame 29 from a trough 48 for the reception of any suitable adhesive substance, the ends of the trough being slidably mounted in grooves 49 formed in the frames 50, the trough 48 having a roller 51 rotatably mounted therein and projecting above the upper edge of the trough, so that as the trough is moved back and forth beneath the frame 29, the face of the roller will engage the lower face of the frame and supply a coating of adhesive material thereto. The trough 48 is moved back and forth below the frame 29 through the medium of a latch 52 which is pivoted to a part of the trough and is so arranged that one or the other end thereof will extend in the path of a lug 53 carried by the chain 12 as shown in Fig. 20 of the drawing. When the latch is in the position shown therein, the lug 53 will engage one end of the latch and cause the trough to travel with the chain as the grippers are being moved for engagement with a sheet of the covering material. When the trough reaches the end of its lateral movement, the inclined face 54 of the latch will engage a trip pin 55 and swing that end of the latch upwardly so as to permit the lug to pass out of engagement with the latch and continue its travel with the chain 12, while the trough remains stationary. This operation disposes the opposite end of the latch in the path of the lug 53 so that when the chain 12 is on its return stroke or moving the covering material toward the corner trimming block, the lug will engage the latch and return the trough 48 to its initial position, the tapered face 56 thereof engaging a trip pin 57 at the opposite end of the frame 50, thus again releasing the latch from the lug and permitting the chain to continue its travel while the trough remains stationary. Any suitable means may be provided for holding the latch in its tilted position or against swinging movement, such as a spring 58 which is carried by the trough and presses against one face of the latch.

After the adhesive substance has been applied to the covering material, the chain 12 resumes its travel and moves the sheet of covering material to position over a movable member 59, (see Figs. 10 and 11) where the grippers release the same, the movable member being mounted in a cavity 60 in a platform $2^a$. Attached to the member 59 and depending therefrom are studs 61 which project through sockets 62, formed in the platform $2^a$, and surrounding said studs are springs 63 between the base member and the bottom of the socket, which springs normally hold the movable member 59 in elevated position.

At this time the cover boards 64 are placed over the sheet of covering material and in position to receive the folding edges of the covering material. The cover boards are mounted in a frame 65 (see Figs. 1 and 2) and are placed in two stacks and the stacks are so spaced apart that the boards will be in proper spaced relation for engagement with the sheet of covering material, when moved into position over the covering material. The parts of the frame 65 are so arranged that they can be adjusted to accommodate cover boards of varying widths and lengths, the adjustment of the boards being accomplished through the medium of a main screw 66 and coöperating adjusting screw 67.

The cover boards 64 are removed in pairs from the frame 65 through the medium of a suction head 68 which is carried by an arm 69, one end of which arm is fixed to a shaft 70 extending vertically through the frame, while the arm 69 extends horizontally from the upper end thereof. The suction head 68 is provided with a plurality of conduits 71 which communicate with a bore 72 extending longitudinally of the arm 69, said bore communicating with a similar bore 73 extending longitudnally of the shaft 70, and by attaching a suction pump 74 (see Fig. 2) to the lower end of the shaft 70 which has communication with the bore 73 through a pipe 75, a vacuum may be created in the suction head and the cover boards caused to adhere to, and travel with, the suction head until such time as the vacuum within the various bores and conduits is released. The operation of the pump 74 is so controlled that when the suction head is positioned directly over the cover boards within the frame 65 and the head is lowered into engagement with the uppermost pair of boards, the piston within the pump will be elevated, thus creating a vacuum through the various bores and conduits and causing the two uppermost boards to adhere to the suction head so that when the suction head is again raised and rotated, the boards will be moved to position over the covering material, when the suction head with the boards thereon will be lowered into engagement with the covering material, where they will be securely held until the covering material is secured to the cover boards.

The downward movement of the suction head is such that the movable member 59 will be moved to the lower portion of the cavity 60 and carry that portion of the sheet 7 of the covering material, resting upon the movable member, downwardly therewith, and as the parts or edges of the sheet of covering material to be folded over the edges of the cover board project beyond the edges of the movable member, said folding edges will, by the lowering action of the movable member, be brought to a substantially vertical position owing to the position of bars 76 employed for folding the edges of the covering material inwardly.

The bars 76 (see Figs. 9 and 12) employed for folding the edges of the covering material over the cover boards are substantially Y-shaped and comprise a stem 77 and angularly disposed arms 78, there being four of the folding bars, one at each corner of the suction head, the arms 78 being less in length than half the length or width of the suction head, so that all of said folding bars may be moved inwardly and in a line convergent toward the axis of the suction head. In order to prevent a gap between the ends of the arms of the folding bars which might result in the formation of a fold in the parts of the covering material as it is folded over, slide plates 79 are arranged on opposite sides of the meeting ends of the arms 78 of the various folding bars so as to present a continuous surface to the part of the covering material being folded over the cover board.

After the movable member 59 has been lowered its full distance, the folding bars 76 are simultaneously moved inwardly, thereby engaging the upturned edges of the sheet of covering material and folding the same over the upper face of the cover board, the cover boards being so positioned that the folding bars will direct a sufficient amount of pressure on the over turned portion of the covering material to cause an adhesion between the cover boards and the overturned edges of the covering material. In order to prevent the cover boards from bending upwardly along their edges when the member 59, is being lowered, a former 80 is placed at each corner of the suction head, the outer angular edges of the formers resting substantially in line with the outer edges of the cover boards while the member 59 is being lowered, thus preventing any upturning or movement of the edges of the cover board. The formers 80 are slidably attached to the suction head wall, each former having a shank 81, which shank is slidable in a way 82 formed at each corner of the suction head, each former being normally held in its outward position by means of a spring $82^a$, the outward movement of the former being limited by means of a screw 83 which passes through the shank 81 and into a recess 84 in the face of the suction head 68. The formers 80 are moved inwardly by the movement of the folding bars 76 and are held in their inward position until such time as the suction head releases the cover, by providing a spring arm 85 on each shank 81. The inner end of each spring arm 85 is provided with a hook 86, (see Figs. 10 and 11) said hook engaging a keeper 87. The keeper 87 is in the form of a disk having an upstanding rib on its edge, said keeper being carried by a stem 88 which projects upwardly through the end of the arm 69 attached to the suction head, the keeper being normally held in elevated position by means of a pressure spring 89 which permits downward movement of the stem and keeper to release the hooks of the spring fingers therefrom, thus permitting the springs $82^a$ to move the formers outwardly. The upper end of the stem 88 (see Fig. 2) normally projects slightly above the arm 69 and said projecting end receives pressure from a trip member 90 (see Fig. 1) whereby the keeper will be lowered and the formers released coincident with the releasing of the cover from the suction head.

After the edges of the covering material have been attached to the edges of the cover boards, rotating motion is again imparted to the shaft 70 which swings the arm 69, suction head 68, and the cover formed by attaching the covering material to the cover board, in the arc of a circle from over the member 59, and when the suction head has reached a position at substantially right angles to the point where the folding operation occurs, the pump is again operated to release the vacuum in the suction head, thereby permitting the cover to drop and in this instance a belt or conveying table 91 is positioned to receive and carry away the completed cover, although any suitable means may be provided for receiving the cover.

The various mechanisms for performing the several operations are operated from a main driving shaft 92 which extends transversely through the frame 1 and connects with a secondary driving shaft 93, through the medium of a plurality of gears 94, 95, 96, 97, and 98, the gear 94 being attached to the shaft 92 and gear 98 to the shaft 93. The corner trimming block 20 carrying the dies 21 is raised and lowered through the medium of pivotally mounted rocking levers 99 which are attached at one end to pull rods 100, while the opposite ends thereof are provided with studs 101 which enter cam channels 102 in cam wheels 103, said cam wheels being attached to the secondary shaft 93, and as said wheels rotate, the block 20 will be raised or lowered.

The plate 25 and the frame members carried thereby are lowered into engagement with the sheet of covering material in order to apply adhesive substance thereto, through the medium of rods 104, the upper ends of the rods being attached to parts of the base plate 25, while the lower ends thereof are connected to a cross bar 105, the ends of said cross bar being in turn provided with studs 106 which engage cam channels 107 in cam wheels 108.

Attached to the secondary shaft 93 is a bevel gear 109 with which meshes a bevel gear 110 carried by a shaft 111 extending at right angles to the shaft 93, said shaft 111 being supported in bearings 112. The outer end of the shaft 111 has an enlarged bevel gear 113 attached thereto, which meshes with a bevel gear 114 on a stub shaft 115 which stub shaft extends vertically through a bearing 116 attached to the end wall 4. The shaft 70 is mounted upon wall 4 by means of bearings 117 and 118, said shaft 70 being driven from the stub shaft 115 by a gear 119 upon the upper end of the stub shaft 115, which meshes with a gear 120 on the shaft 70. As it is necessary to stop rotation of the shaft 70 at intervals while the stub shaft 115 continues to rotate, a Geneva stop is provided which is formed by omitting a plurality of teeth from the gear 119 to provide a smooth section 121, while portions of the teeth of the gear 120 are omitted in two places to provide smooth surfaces 122 and 123, so that when the smooth portion 121 of the gear 119 comes into registration with one or the other of the smooth portions of gear 120, said gear 120 and parts attached thereto will remain stationary until gear 119 has rotated a sufficient distance to again bring the teeth thereon into engagement with the teeth on the gear 120. By arranging the gears in this manner, the gear 120 will be given a half rotation each time and at the conclusion of each rotation will stand stationary during a partial rotation of the gear 119. The object in providing the interrupted gears is to permit the suction head to remain stationary a predetermined time, when it is moved to position over the base member 59, or over the stacks of cover boards carried by the frame structure 65.

The shaft 70 is moved vertically in order to raise or lower the arm 68 and the suction head carried thereby, when the suction head is positioned over the base member 59, or over the stacks of cover boards 64 through the medium of a rocking lever 124 which is pivoted adjacent its longitudinal center, as at 124ª, one end of said lever having a stud 125 which enters a cam channel 126 in a cam wheel 127 while the opposite end of said lever is bifurcated and engages a collar 128 on the shaft 70, said bifurcated end of the lever 124 having pins 129 which enter a peripheral channel 130 in the collar 128. By this construction when the inner end of the rocking lever 124 is raised or lowered, the shaft 70, together with the parts carried thereby, will be lowered or raised.

Rotatably mounted on the end wall 4 is a shaft 131, at one end of which is a bevel gear 132 with which meshes a smaller gear 133 on the shaft 70, the opposite end of the shaft having a disk 134 attached thereto for operating the chains 12.

The train of gears employed for operating the chains 12 is best shown in Fig. 18 of the drawings, and comprises a pinion 135 which is mounted upon a shaft 136 extending transversely of the frame 1, said shaft also having the sprockets 13 thereon around which the chains 12 travel. Meshing with the pinion 135 is a gear 137, said gear being mounted upon a stub shaft 138, carried by the side wall of the frame 1 and fixed with said gear 137, and on the shaft 138 is a gear 139, said latter gear being adapted to mesh with a gear 140, also secured to a stub shaft 141 carried by the side wall of the frame. The peripheral edge of the gear 139 is provided with a smooth portion 142 with which coöperates an elongated smooth portion 143 of the gear 140 forming a Geneva stop so that the rotation of the gear 139 will be interrupted, thus permitting the chains to remain idle at predetermined times. Attached to the gear 140 is a gear 144 which meshes with an enlarged gear 145 said enlarged gear having a smaller gear 146 attached thereto, which meshes with a gear 147 and coöperating with the gear 147 is a segmental rack 148. The segmental rack 148 (see Figs. 2 and 18) is carried by a shank 149, the lower end of which is pivoted so that by swinging the rack in the arc of a circle, the train of gears for operating the pinion 135 will be rotated in opposite directions. The segmental rack 148 is rocked back and forth by a pitman 150 one end of which is attached to the shank 149 midway between its ends the opposite end of the pitman being pivoted to the face of the disk 134 the pivotal point being pivoted between the pitman and the disk, adjacent the peripheral edge of the disk, thus giving the shank 149 a reciprocating motion when the disk 134 is rotated.

The various gears employed in the train of gears are so timed that the gear 140 will make three complete revolutions with each half revolution of the shaft 70, so that while the suction head is moving from the piles of cover boards to position over the member 59, the sheet of covering material will be successively moved below the cutting dies, then below the adhesive applying means and then into position over the member 59, the movement of the chain being stopped at all three of these places.

After the suction head carrying the cover boards has been properly positioned above the sheet of covering material on the member 59 and then lowered by the action of the rocking lever 124, the folding bars 76 are simultaneously moved inwardly toward a common center by means of bell crank levers 151 (Figs. 2 and 3) which are pivotally mounted to hangers 152 depending from the under face of the platform 2, the vertical arms of the bell crank levers engaging slotted blocks 153 carried by the stems 77 of the folding bars 76 while the free ends of the opposite arms thereof are engaged with a head 154, said head being provided with a slot 155 into which the ends of the bell crank levers project. The head 154 is connected to a rod 156, the lower end of the rod being attached to a pivotally mounted lever 157, the opposite end of said lever having a pin 158 which enters a cam channel 159 in a cam wheel 160, said cam wheel being mounted upon the shaft 93. The piston of the pump 74 is operated by a cam wheel 161 upon the shaft 111, said cam wheel having a cam channel 162 therein, into which enters a pin 163 attached to the piston shaft 164, the contour of the cam channel 162 being such that the piston will be raised and held in raised position so as to create a vacuum in the suction head during the greater portion of the revolution of the cam wheel 161.

As the cover boards 64 are successively removed from the frame structure, the remaining boards are moved upwardly the thickness of one board, which is accomplished by providing a threaded shaft 165, which, when rotated moves the platform upon which the cover boards are resting, upwardly, a train of gears being introduced between the shaft 70 and the shaft 165. This train of gears is best shown in Fig. 17 and comprises a pinion 166 fastened to the shaft 70, with which meshes a gear 167, said gear having attached thereto a smaller gear 168 which meshes with an intermediate gear 169, said gear 169 in turn meshing with an interchangeable gear 170 carried by the shaft 165. By providing the intermediate gear 169 and changing the size of the gear 170, the speed of operation of the shaft 165, as when a heavier or lighter cover board is being used, may be readily changed to correspond to the thickness of the cover board.

In operation, supposing the parts to be in the position shown in Fig. 2, the rotation of the stub shaft 115 will cause the shaft 70 to rotate and swing the arm 69 and suction head attached thereto in the arc of a circle, and as soon as the suction head is clear of the base member 59, rotating motion will be imparted to the shaft 136, which will rotate the sprocket gears 13 and move the grippers longitudinally of the platform 2 until they are brought into engagement with the sheet of covering material 7 resting upon the guide 5, the arm 69, during this operation, having positioned the suction head over the stacks of cover boards carried by the frame structure 65.

As soon as the grippers have been engaged with the forward edge of the sheet of covering material, the segmental rack 148 will have made its full stroke in one direction and will then start in reverse direction, thereby reversing the rotation of the train of gears employed for driving the shaft 136 and consequently moving the grippers and the sheet of covering material toward the opposite end of the machine. As the covering material reaches a position below the corner-trimming block, the interrupted gears will have been rotated until the smooth portions thereof have come together, thereby causing the chains 12 to stand still, and during this time, the corner trimming block will have performed its operation. The portions of the interrupted gears having the teeth, will, by this time, have been rotated until the teeth of the respective gears will have engaged each other, thereby again imparting movement to chains 12 and conveying the covering material to a position below the adhesive applying means. At this time the smooth portions of the interrupted gears will again have moved together, and again the chains to remain idle until the adhesive material has been applied to the face of the covering material. As soon as this operation is completed, the chains 12 will resume their movement and convey the covering material in position over the member 59, at which point the grippers will be released from the covering material. During the movement of the covering material from one end of the machine to the other, the arm 69 and suction head carried thereby will have made a half revolution, thus bringing a pair of cover boards from the frame structure to a position directly over the covering material resting upon the member 59. The folding and pasting operation then occurs, the smooth portions of the interrupted gears being together, when the above operation is again repeated,—these operations being successively repeated as each book cover is finished. As soon as the suction head 68 has been moved substantially 90 degrees from the position shown in Fig. 1. the cam 161 will have turned to such position as to release the vacuum in the suction head, thereby permitting the finished cover carried by the head to descend, the suction remaining released until the suction head is further rotated and brought into engagement with the uppermost cover boards, when the cam 161 will have turned to such position as to again create a vacuum in the suction head, thereby causing the two uppermost cover boards to adhere to the lower face of the suction head. They are then held and swung into position over the sheet of covering material.

Heretofore it has been found impractical to mechanically form a cover having rounded corners owing to the fact that folds would develop in the folded over parts, consequently producing a very rough, unfinished piece of work. By employing the present device, however, for trimming the corners of the covering material so that they will fold over without producing overlapping parts and in view of the positive manner in which the edges of the covering material are folded, a perfect cover is produced and having a smooth, finished, round corner, such operation being performed without securing any parts of the cover boards to the covering material before the edges of the covering material are turned over and secured thereto. It will also be seen that by employing this machine, the cost of production will be greatly reduced and as no part of the covering material is secured to the cover boards other than the inturned edges, a perfectly flexible cover will be produced.

The invention claimed is:

1. A machine for forming book covers including means for holding the edges of the cover boards against upward yielding movement while the edges of the covering material are folded over the edges of the cover boards, and means for turning the edges of the covering material over the edges of the cover boards, the inner edges of said turning means directly engaging and pressing against the holding means for moving said holding means inwardly and out of the path of the folding over edges of the covering material.

2. In a machine for forming book covers, means for transporting a sheet of covering material, means for engaging and positioning a pair of cover boards in spaced relation over said covering material, means for holding the edges of the cover boards against upward movement while the edges of the covering material are folded over the cover boards, means for simultaneously folding all the edges of the covering material over the edges of the cover boards, said folding means directly engaging with and moving the edge holding means inwardly out of the path of the folding edges of the covering material, and means for carrying the finished product to a predetermined point before releasing the same.

3. In a machine for forming book covers, the combination of means for engaging and transporting a sheet of covering material, means for intermittently operating the conveying means, means for trimming the corners of said covering material, means for applying an adhesive to the edges of the covering material, means to position a pair of cover boards over said sheet of covering material, means for holding the edges of the cover boards against upward movement, and means contacting with and for moving said holding means inwardly and simultaneously folding the edges of the covering material over the edges of said cover boards.

4. In a machine for making book covers, the combination with a support for a sheet of covering material and cover boards, and means for folding the edges of the sheet of covering material over the edges of the cover boards, of a suction head adapted to rotate in a circular path, means to create a vacuum in the suction head, whereby a pair of cover boards will be held to said suction head during a portion of the travel of the suction head, and held thereby upon the support and against the covering material during the folding operation, and means carried by the suction head for holding the edges of the cover board against upward movement.

5. In a machine for making book covers, a member for supporting a sheet of covering material in position to receive cover boards, a suction head adapted to rotate in a circular path and intermittently position over said support, means to intermittently actuate said suction head, means to raise and lower said suction head, means to create a vacuum in the suction head whereby a pair of book covers will be attracted thereto and held thereby in spaced relation against the sheet of covering material, and movable means at the edges of the suction head for holding the edges of the cover boards against upward movement.

6. In a machine for making book covers, the combination with a platform having a cavity therein, and a vertically movable member in said cavity, said base member forming a support for a sheet of covering material, of folding bars, means to move said bars inwardly to fold the edges of the covering material, a suction head for conveying cover boards into position over and holding them against the covering material, and movable means carried by said head for holding the edges of the cover boards against upward movement during the folding operation, said holding means being moved inwardly and out of the path of the folding edges of the covering material by said folding bars.

7. In a machine for making book covers, the combination with a spring supported vertically movable member adapted to support a sheet of covering material and a pair of cover boards, of a plurality of bars adapted to fold the edges of the sheet of covering material over the edges of said boards, means for operating said folding bars, a rotating suction head adapted to convey and hold the cover boards in engagement with the sheet of covering material during the folding operation, and a plurality of holding bars movably mounted upon said suction head for holding the edges of the cover boards against upward movement during the folding operation, said bars being moved inwardly and out of the path of the folding material by said folding bars.

8. In a machine for making book covers, the combination with a vertically movable platform adapted to support a sheet of covering material and a pair of cover boards, of a plurality of bars adapted to fold the edges of the covering material over the edges of the cover boards, a suction head for positioning the cover boards over and holding them against the covering material during the folding operation, movable means at each corner of the suction head for holding the edges of the cover boards against bending while the folding operation is being performed, said movable means being moved inwardly by the folding bar and means for retaining the last means against outward movement for a prescribed time.

9. A machine for folding the edges of a sheet of covering material, over the edges of cover boards including a plurality of substantially Y-shaped folding bars, means for simultaneously moving all of said folding bars inwardly toward a common center for folding the edges of the covering material over the edges of the cover boards, and a plurality of substantially L-shaped bars for holding the edges of the cover boards against upward movement during the folding operation, said latter bars being moved inwardly out of the path of the folding material by the movement of said folding bars.

10. A machine for folding the edges of a covering material over the edges of cover boards, including a plurality of substantially Y-shaped folding bars, means for simultaneously moving all of said folding bars inwardly toward a common center for folding the edges of the covering material over the edges of the cover boards, and slide plates connecting the ends of the folding bars to form continuations thereof.

11. A machine for folding the edges of covering material over the edges of cover boards, including a plurality of folding bars, means to move said bars angularly toward a common center, formers for holding the edges of the cover boards against upward movement during the folding operation, spring arms carried by said formers, and means for engagement with said spring arms for holding the formers inwardly a prescribed time.

12. A machine for folding the edges of covering material over the edges of cover boards, including a plurality of folding bars, means to move said bars inwardly toward a common center, formers for holding the edges of the cover boards against upward movement during the folding operation, spring arms carried by said formers, and a keeper for engagement with said spring arms for holding the formers against movement for a prescribed time.

13. A machine for folding the edges of covering material over the edges of cover boards, including a plurality of folding bars, means to move said bars inwardly toward a common center, formers for holding the edges of the cover boards against upward movement during the folding operation, spring arms carried by said formers, a keeper for engagement with said spring arms for holding the formers against movement for a prescribed time, and means for lowering said keeper to disengage the same from said spring arms.

In witness whereof, I have hereunto affixed my signature.

THOMAS DEAN.